United States Patent [19]

Johnson et al.

[11] Patent Number: 4,952,904
[45] Date of Patent: Aug. 28, 1990

[54] ADHESION LAYER FOR PLATINUM BASED SENSORS

[75] Inventors: Robert G. Johnson; James O. Holmen, both of Minnetonka, Minn.; Ronald B. Foster; Uppili Sridhar, both of Garland, Tex.

[73] Assignee: Honeywell Inc., Minneapolis, Minn.

[21] Appl. No.: 289,098

[22] Filed: Dec. 23, 1988

[51] Int. Cl.⁵ ............................................. H01L 10/10
[52] U.S. Cl. ..................................... 338/36; 338/306; 338/309; 338/314; 357/25; 427/103
[58] Field of Search ................... 338/36, 37, 306, 308, 338/309, 314, 319, 320; 204/290 R, 290 F; 357/4, 23.7, 25, 26; 427/101, 103

[56] References Cited

U.S. PATENT DOCUMENTS

| | | | |
|---|---|---|---|
| 4,234,405 | 11/1980 | Hesketh et al. | 204/290 F |
| 4,423,087 | 12/1983 | Howard et al. | 427/79 |
| 4,471,405 | 9/1984 | Howard et al. | 361/305 |
| 4,624,137 | 11/1986 | Johnson et al. | 338/319 X |
| 4,682,206 | 7/1987 | Tsuya et al. | 357/4 X |

OTHER PUBLICATIONS

W. Diehl, "Platinum Thin-Film Resistors as Accurate and Stable Temperature Sensors", Measurements and Control, Dec. 1982, pp. 155-159.

Primary Examiner—George H. Miller, Jr.
Assistant Examiner—Marvin M. Lateef
Attorney, Agent, or Firm—Gregory A. Bruns

[57] ABSTRACT

The marginal adhesion of platinum to silicon nitride is a serious issue in the fabrication of microbridge mass air flow sensors. High temperature stabilization anneals (500°-1000° C.) are necessary to develop the properties and stability necessary for effective device operation. However, the annealing process results in a significant reduction in the already poor platinum/silicon nitride adhesion. Annealing at relatively high temperatures leads to the development of numerous structural defects and the production of non-uniform and variable sensor resistance values. The use of a thin metal oxide adhesion Layvr, approximately 20 To 100 angstromw in thickness is very effective in maintaining platinum adhesion to silicon nitride, and through the high temperature anneal sequence.

22 Claims, 2 Drawing Sheets

ADHESION LAYER FOR PLATINUM BASED SENSORS

BACKGROUND AND SUMMARY OF THE INVENTION

The field of this invention is air velocity or flow sensors, particularly of the general type called microbridge mass air flow (MAF) sensors as typified by the devices shown in such U.S. Pat. Nos. as 4,472,239; 4,478,076; 4,478,077; 4,501,144; 4,548,078; 4,566,320; 4,581,928; 4,624,137; 4,651,564; and 4,696,188, all assigned to the same assignee as the present invention.

In microbridge sensors, thin platinum films of preferred thickness of 1000 angstroms must be strongly attached to an atomically smooth silicon nitride substrate, typically 5000 angstroms thick, on a polished silicon wafer surface. Without an intermediate adhesion layer between the nitride and the platinum, the attachment is weak, and fails to withstand annealing temperature stresses of 600° C. or more that are required to give the platinum stable electrical characteristics.

Metal adhesion layers are not satisfactory because, although some metals adhere satisfactorily to both the nitride and the platinum, all suitable refractory metals that have been investigated (including chromium, titanium, tungsten, nickel, iron, and tantalum) diffuse into the platinum during the anneal, and adversely change its electrical characteristics by increasing its resistivity and reducing its temperature coefficient.

The invention specifies the use and the properties of a class of refractory metal oxide layers that do not have the disadvantages of metal or metal alloy layers.

The flow sensors of this prior art generally comprise a pair of thin film heat sensors and a thin film heater The flow sensors further comprise a semiconductor body with a depression therein and structure connecting the heater and the sensors to the body and bridging the depression so that at least the major portion of the heater and sensors are out of contact with the body. The sensors are disposed on opposite sides of the heater. The heater is operated above ambient temperature under both flow and no-flow conditions. FIGS. 1 and 2 are representative prior art microbridge MAF structures of this type as disclosed in U.S. Pat. No. 4,501,144 already cited above. Thus, there is disclosed a pair of thin film heat sensors 22 and 24, a thin film heater 26, and a semiconductor base 20, preferably monocrystalline silicon, supporting the sensors and heater out of contact with the base. The sensors and heater of this prior art device were described as being preferably fabricated of nickel-iron (permalloy) and these sensor and heater grids are encapsulated in a thin film of dielectric, typically comprising layers 28 and 29, preferably of silicon nitride Air space 30 formed by selective etching of a depression in the monocrystalline silicon base 20 allows the elements 22, 24, and 26 to be surrounded by air. More detail of these prior art figures may be had by reference to U.S. Pat. No. 4,501,144, the teachings of which are incorporated herein by reference.

In the present invention the MAF sensor utilizes the material platinum (in preferred thickness of 1000 angstroms or less) in the fabrication of the resistive elements 22, 24, and 26 although the invention is not in the use of platinum per se. For certain applications, platinum is preferred over permalloy. The poor adhesion of platinum to silicon nitride is a serious issue in this fabricating process.

The possibility of attaching platinum film to various oxide-based ceramics has been explored in prior art. In such prior art, platinum films greater than 4500 angstroms in thickness are said to be adherent to oxide-based ceramics in which the adhesion is said to be dependent on the rough surface of the ceramic, and on the presence of minor constituents in the ceramic, which is never a single compound. This roughness is on a scale of many microns up to thousandths of an inch, and would not be suitable for films in the 200 to 3500 angstrom range, for example, for which polished surfaces are required that have no discontinuities due to roughness.

An objective of this invention is to provide an atomically smooth adhesion layer between the platinum metal sensor layer and the nitride substrate, such that roughness of the interface is not required The layer of this invention must each satisfy two requirements: (1) it must form a strong bond to the platinum and to the silicon nitride, and (2) it must be physically stable against diffusion of its constituent atoms, or any impurities it may contain, into the platinum.

There is no problem with the attachment of the adhesion layer to the nitride. As we have determined experimentally, many non-noble metal oxides adhere well to the nitride substrate The problem addressed by the invention is the reliable adherence of the adhesion layer to a platinum layer or to other noble metal layers without deterioration of the adhesion or the electrical properties during the anneal.

Various metallic adhesion layers are known in the prior art such as Cr and Ti:W alloy, however, these materials are completely inadequate for use in this invention. Standard metallic adhesive films, such as Cr or Ti:W alloy can interact with and diffuse into platinum at the elevated annealing temperatures to result in adhesion failure and to severely degrade properties such as TCR and resistance. If no adhesion promoter is used, widespread delamination, blistering and/or agglomeration will result during the necessary high temperature anneal. One of the known prior art microstructure gas flow sensors illustrates the limitations which are associated with using a standard chromium (Cr) metal adhesion film with a platinum sensor. This prior art device utilizes a chromium adhesion layer of about 50 angstroms beneath the thin film ($\sim$1000 angstroms) platinum resistor. With this arrangement, the annealing temperatures are, of necessity, controlled to less than 400° C. to avoid diffusion of chromium into the platinum, whereas platinum is not effectively stabilized with anneals less than about 500° C. If annealing temperatures were to exceed 400° C., a platinum/chromium interdiffusion takes place which severely degrades the platinum sensor properties, for example, by reducing the temperature coefficient of resistance (TCR) to less than half the value obtained by the use of this invention.

The adhesion layer must be pure with respect to metallic impurities or excesses of the principal metal This prevents diffusion of metal atoms from the adhesion layer into the platinum. This stability is particularly important for films of typical thickness of 1000 angstroms because a specified quantity of impurity atoms will have adverse electrical effects after the anneal that are in inverse proportion to the thickness of the platinum film. The oxide adhesion layer must be stable, and yet must have surface atoms that bond well to the platinum atoms. However, not all stable oxide layers adhere well. The oxygen surface atoms do not bond well, because platinum oxide is weakly bonded and decomposes at temperatures of the anneal. Therefore, it is the metallic component of the oxide that must form the strong bond. We have tried silicon dioxide and one might expect $SiO_2$ to be a good adhesion layer candidate, because some platinum silicides are stable above the anneal temperatures (PtSi is stable to 1100° C.), however, $SiO_2$ is not satisfactory. Si is not a metal, and in the absence of the actual silicide compound, the Pt/Si bond may not be of comparable strength to a Metal/Pt bond of a more generalized type.

The common factor shared by the satisfactory, preferred metal oxide adhesion layer types is that the metal oxides are quite refractory. That this factor can be a requirement for a successful adhesion layer of this invention is supported by the argument that the oxide must be stable against decomposition which could release metal atoms to contaminate the platinum. We have not investigated all the available metal oxides. However, the following table lists the melting points of the refractory metal oxides which we have found to form adhesion layers which are strongly bonded to and do not contaminate the platinum. It is worthy to note that all of these oxides can be deposited by sputtering reactively in a suitable partial pressure of oxygen to ensure that no excess of metal atoms exists to diffuse into and to contaminate the platinum.

| metal/oxide | melting point (°C.) |
| --- | --- |
| NiO | 1984 |
| $Ta_2O_5$ | 1870 |
| $Cr_2O_3$ | 2420 |
| $Al_2O_3$ | 2050 |

In this invention, the use of a thin metal oxide intermediate layer, i.e., chromium oxide ($Cr_2O_3$), aluminum oxide ($Al_2O_3$), tantalum oxide ($Ta_2O_5$), nickel oxide ($Ni_2O_3$), etc. significantly improves the adhesion of the platinum sensor films on silicon nitride. Incorporation of this adhesion layer also minimizes the development of structural defects and sensor resistance variations which are otherwise encountered.

One method of fabricating such oxide films makes use of electron beam evaporation of the oxide under high vacuum conditions. We have made satisfactory $Al_2O_3$ adhesion layers in this way. This method produces satisfactory adhesion layers, provided that steps are taken to insure correct stoichiometry of the metal oxides. This is necessary to prevent contamination of the platinum by excess metal migrating from the adhesion layer. Using electron beam evaporation, it is generally easier to maintain higher purity of the deposited films relative to sputtering. Purity may be an important consideration when attempting to reproducably obtain a high temperature coefficient of resistance.

An alternate method is gas discharge sputter deposition with an oxygen component in the discharge gas. With sufficient excess oxygen the complete oxidation of the adhesion layer is assured. The following sensor layer processing sequence using sputter deposition is one which can be utilized in the fabrication of Pt sensors with significantly improved adhesion stability.

| (1. INITIAL DEVICE PROCESSING STEPS) |
| --- |
| 2. SENSOR LAYER PROCESSING STEPS |

| -continued |
| --- |
| (1. INITIAL DEVICE PROCESSING STEPS) |
| PRE DEPOSITION CLEANING |
| LOAD SPUTTERING SYSTEM AND PUMP-DOWN TO HIGH VACUUM/LOW RESIDUAL GAS LEVEL |
| SPUTTER ETCH CLEAN |
| REACTIVELY SPUTTER METAL OXIDE ADHESION LAYER/~50 Å |
| ANNEAL AT 700° C. |
| SPUTTER ~1000 Å Pt |
| REACTIVELY SPUTTER METAL OXIDE ADHESION LAYER/~ 50 Å |
| PHOTOLITH./PATTERN-ION MILL OXIDE/Pt/OXIDE SENSOR STACK |
| PHOTO RESIST STRIPPING SEQUENCE |
| (3. INTERMEDIATE AND FINAL DEVICE PROCESSING STEPS) |

The examples referred to in this disclosure describe RF sputtering as a method utilized for the deposition of the oxide adhesion layers and Pt sensor films.

Inherent in most sputtering processes is the capability to backsputter, or sputter etch the substrates to remove surface contaminants and/or a thin (<100 Å) substrate surface layer to provide a clean base material for the subsequent depositions.

However, this invention is not limited to the narrow processing area of sputtering, only. Electron beam evaporation, Ion beam deposition, etc., techniques can be utilized to deposit the oxide adhesion layers and Pt sensor films needed in the fabrication of Pt-based sensing devices. In situ substrate cleaning techniques can also be adapted to these other procedures, to provide a clean substrate surface for the subsequent depositions.

DETAILED DESCRIPTION OF THE PREFERRED EMBODIMENT

The marginal adhesion of platinum to silicon nitride is a serious issue in the fabrication of platinum based sensors. High temperature anneals, that is, 500°-1000° C., are required to develop the properties and stability necessary for effective device performance. The necessary annealing process, however, accentuates the problem of the already poor platinum to silicon nitride adhesion. These anneals are necessary to develop the device sensitivity, stability, and reliability needed for meeting device specifications.

The use of a thin, non-reactive metal oxide (such as $Cr_2O_3$, $Ta_2O_5$, $Ni_2O_3$, and others) adhesion layer in the thickness range of 20 to 100 angstroms, is very effective in enhancing and maintaining platinum adhesion to silicon nitride. This adhesion is continued through the high temperature anneals. Moreover, incorporation of the thin oxide adhesion layer significantly minimizes the development of structural defects and results in markedly improved uniformity and control of platinum sensor/heater resistance properties.

The oxide adhesion layer does not react with platinum to adversely influence the temperature coefficient of resistance (TCR) or cause undesired changes in resistance. Thus, the use of the oxide adhesion layer in the platinum sensor fabrication significantly improves the reliability.

Figure 1:
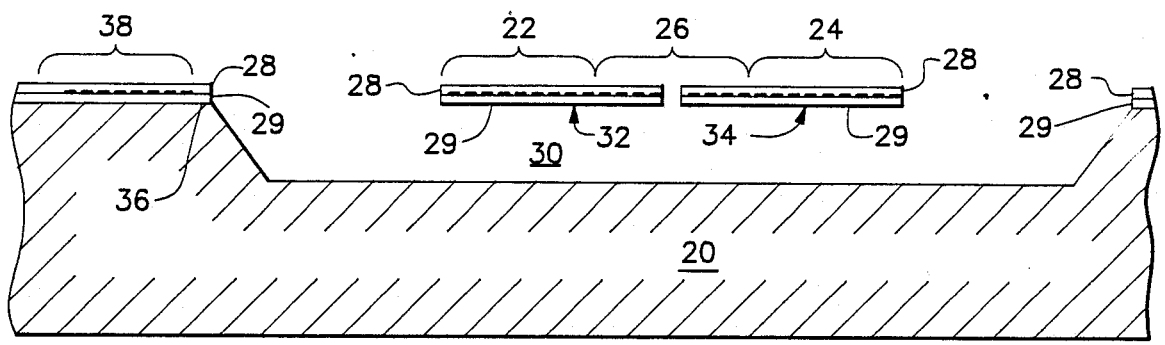
FIGS. 1 and 2 disclose a prior art microbridge device for sensing mass air flow.
Figure 2:
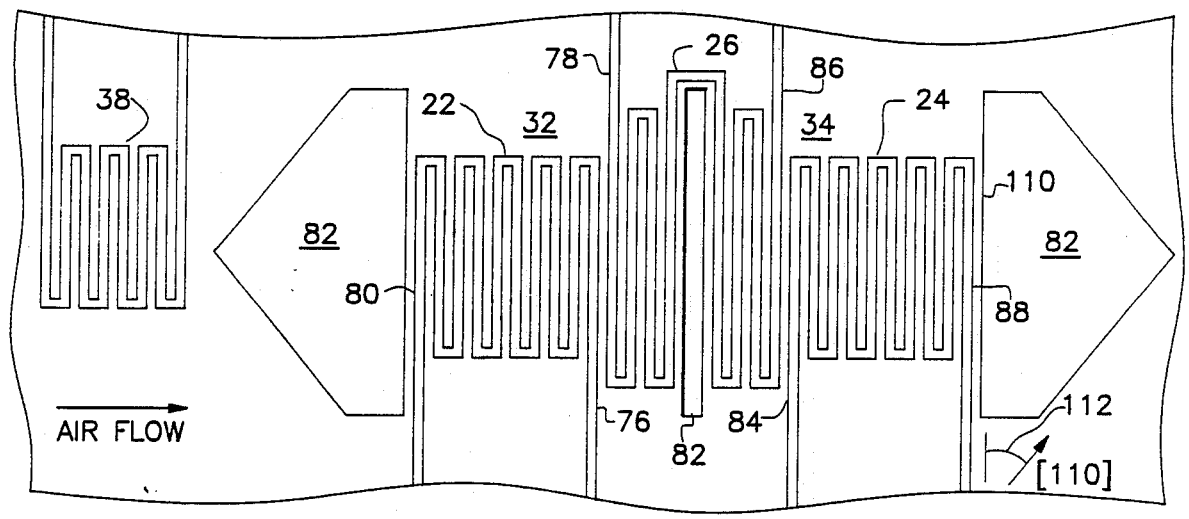
Figure 3:
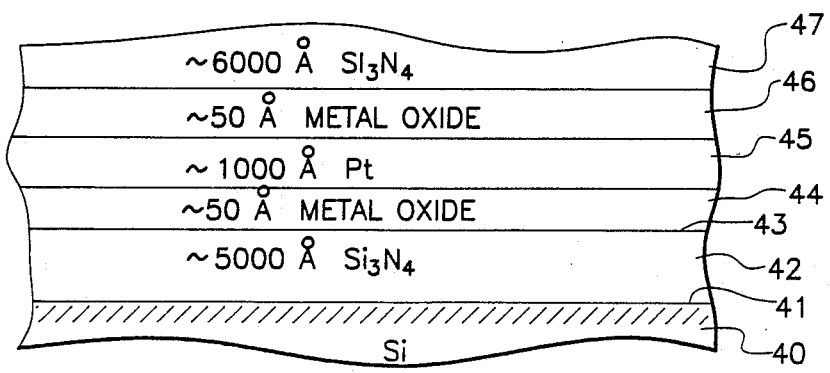
FIG. 3 shows a cross-section view of a portion of the structure according to the invention showing a chromium oxide embodiment of the adhesion layer.

Referring now to FIG. 3, there is shown a silicon substrate 40 having on the surface 41 thereof a thin film of silicon nitride 42. The silicon nitride layer may be, for example, on the order of 5000 angstroms in thickness Deposited on the surface 43 of the silicon nitride is a very thin (20-100 angstroms) layer of non-reactive metal oxide 44. Chromium (or chromic) oxide ($Cr_2O_3$) is one of many effective embodiments of the metal oxide adhesion layer. The thin layer of platinum 45 is then deposited over the $Cr_2O_3$ adhesion layer. This layer 45 may typically be on the order of 1000 angstroms in thickness, however the thickness may be varied widely depending on the model. A surface $Cr_2O_3$ adhesion layer 46 is also utilized to promote adhesion between platinum layer 45 and the encapsulation silicon nitride layer 47. The incorporation of a thin oxide film, not only is an effective adhesion promoter for platinum on silicon nitride, but also minimizes the development of structural defects and the resultant non-uniform resistance which is observed in platinum-only (that is, no adhesion layer) films at elevated temperatures (500°-700° C.). Also, there are no apparent reactions between the metal oxide adhesion layer and the platinum and the TCR and resistance do not deteriorate as they do when atoms from metal adhesion layers diffuse into the platinum film.

It would be expected that the thickness of the adhesion layer would not affect its adhesion properties once the thickness exceeded a critical value necessary to completely cover the silicon nitride substrate. In extensive experiments with chrome oxide adhesion layers, we have found that the critical minimum thickness for good adhesion is about 20 angstroms, with a preferred thickness of about 50 angstroms. The 50 angstrom thickness, though preferred, is not in any sense a limiting thickness, as other thicknesses will perform well. We have not defined the thickness effect for nickel oxide or tantalum oxide, but the initial experiments with both oxides have given very good quality adhesion and electrical characteristics of the platinum even for anneals as high as 950° C. with the preferred 50 angstrom thick adhesion layers.

In the deposition of the metal oxide adhesion layers, the oxides are reactively sputtered in the static mode from a metal target. The oxygen concentration is kept more than high enough to result in fully reacted material.

Oxides of chromium, aluminum, titanium, tantalum, and nickel were evaluated as adhesion promoting layers for platinum. All oxide films evaluated thus far effectively promote platinum adhesion and permit stabilization and property development anneals at elevated temperatures without deleterious chemical reactions and without the development of defects, delaminations, and uncontrolled resistance shifts that are evident in annealed platinum-only films.

Figure 4:
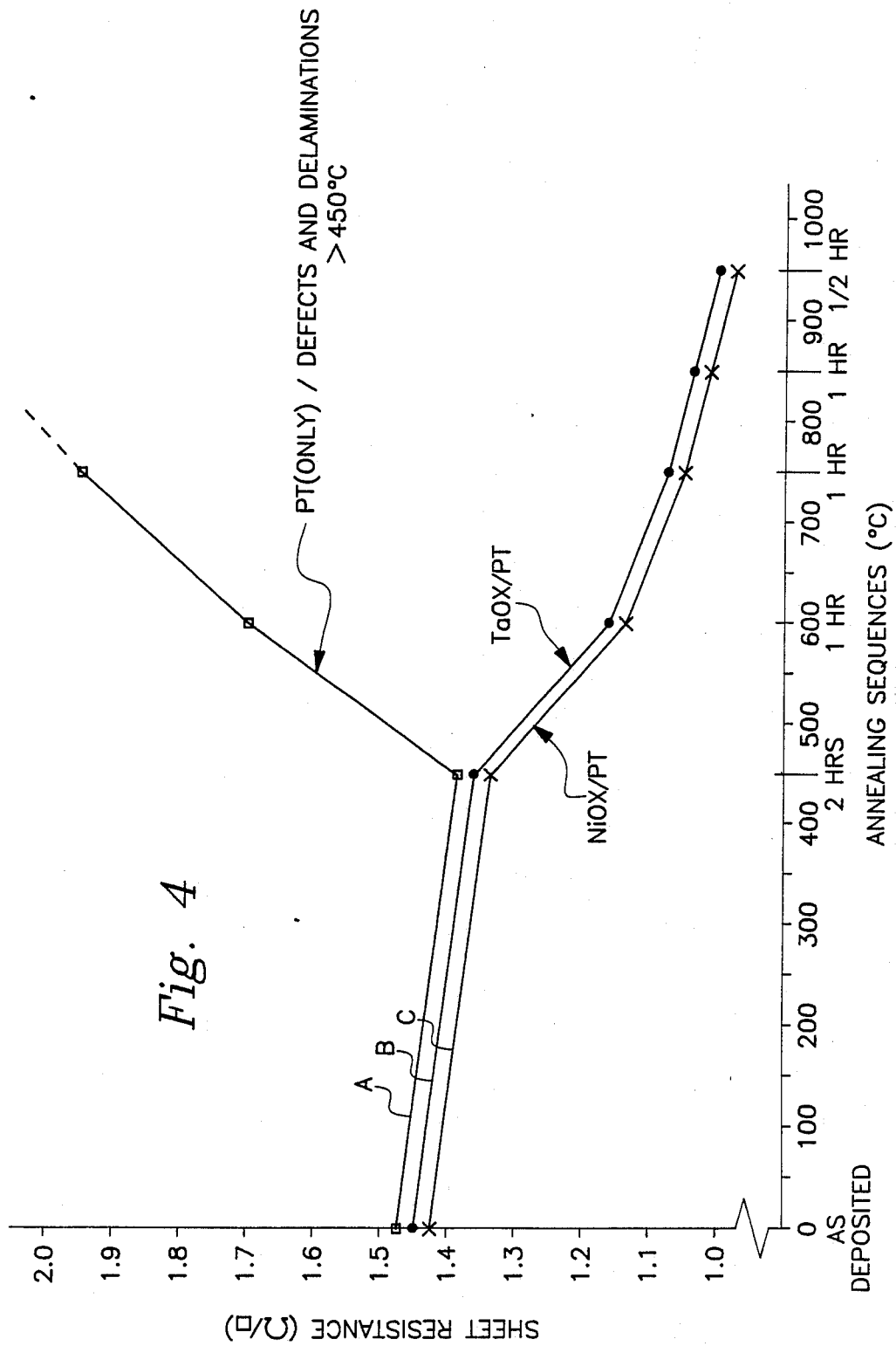
FIG. 4 graphs sheet resistance versus annealing temperature.

In FIG. 4, there is shown graphically a plot of the measured sheet resistance vs. annealing temperature for 1000 angstrom platinum films both with and without a metal oxide adhesion layer between the $Si_3N_4$ and the platinum film. Three curves are shown on this graph, curve A represents the results when platinum is deposited directly on the silicon nitride with no adhesion layer. Curve B represents the results when using an adhesion layer of tantalum oxide and Curve C when using an adhesion layer of nickel oxide. It can be seen that the curves track closely with each other at the lower annealing temperatures up to 450° C. Above that temperature, curve A has a discontinuity and breaks sharply upward with defects and delaminations of the platinum occurring. Successful annealing of the platinum with the tantalum oxide and with the nickel oxide adhesion layers was conducted up to 950° C.

The embodiments of the invention in which an exclusive property or right is claimed are defined as follows:

1. A thin film platinum on silicon nitride sensor structure with an adhesion enhancement interlayer, the sensor structure comprising:
   a layer of silicon nitride having a surface on which it is desired to deposit an electrically resistive thin film layer of platinum;
   a thin film interlayer of a metal oxide deposited on said silicon nitride surface as an adhesion promoter for platinum; and
   a thin film of platinum deposited on said metal oxide interlayer whereby the metal oxide interlayer enhances the bond of platinum to silicon nitride.

2. The structure according to claim 1 in which the thin film layer of metal oxide has a thickness on the order of about 50 angstroms.

3. The structure according to claim 1 in which the thin film layer of metal oxide and of platinum are sputtered depositions.

4. The structure according to claim 1 in which the metal oxide is selected from the group consisting of chromium oxide, titanium oxide, tantalum oxide, nickel oxide, and aluminum oxide.

5. The structure according to claim 1 in which the metal oxide is chromium oxide.

6. The structure according to claim 1 in which the metal oxide is tantalum oxide.

7. The structure according to claim 1 in which the metal oxide is nickel oxide.

8. The structure according to claim 1 in which the metal oxide is aluminum oxide.

9. A thin film platinum-based sensor structure comprising:
   a substrate of silicon having a first surface;
   a thin film of silicon nitride on said silicon surface;
   a thin film interlayer of a metal oxide deposited on said silicon nitride as an adhesion promoter for platinum on silicon nitride;
   a thin film of platinum deposited on said metal oxide interlayer whereby the metal oxide interlayer enhances the bond of platinum to silicon nitride;
   a second thin film layer of metal oxide over said platinum; and
   a passivating silicon nitride layer over said second metal oxide layer and said platinum layer.

10. The structure according to claim 9 in which the thin film layer of metal oxide has a thickness in the range of about 20 to 100 angstroms.

11. The structure according to claim 9 in which the metal oxide, platinum and metal oxide layers are sputter depositions.

12. The structure according to claim 9 in which the metal oxide is selected from the group consisting of chromium oxide, titanium oxide, tantalum oxide, nickel oxide, and aluminum oxide.

13. A method of fabricating a high-adhesion platinum-based sensor on a silicon nitride base comprising the steps of:

providing a silicon nitride layer having a surface upon which it is desired to deposit an electrically resistive path of platinum;

depositing a thin film interlayer of a metal oxide on said silicon nitride surface as an adhesion promoter for platinum;

depositing a thin film of platinum on said metal oxide interlayer whereby the metal oxide interlayer enhances the bond of platinum to silicon nitride so that a high adhesion platinum layer results.

14. The method according to claim 13 in which the depositing of metal oxide and of platinum is by sputter deposition.

15. The method according to claim 13 in which the depositing of metal oxide is to a thickness in the range of about 20 to 100 angstroms.

16. The method according to claim 13 in which the metal oxide is selected from the group consisting of chromium oxide, titanium oxide, tantalum oxide, nickel oxide, and aluminum oxide.

17. A method of fabricating a high-adhesion platinum-based sensor structure, the steps comprising:

providing a substrate of silicon having a thin film of silicon nitride on the surface thereof and upon which it is desired to deposit a thin film layer of platinum;

depositing a thin film interlayer of a metal oxide on said silicon nitride;

depositing a thin film layer of platinum on said metal oxide interlayer whereby the metal oxide interlayer enhances the bond of platinum to silicon nitride so that a high adhesion platinum layer results;

depositing a second thin film interlayer of metal oxide over the platinum; and depositing a passivating silicon nitride layer over said second metal oxide layer and said platinum layer.

18. The method according to claim 17 in which the steps of depositing of metal oxide and the step of depositing of platinum is by sputter deposition.

19. The method according to claim 17 in which the depositing of metal oxide is to a thickness in the range of about 20 to 100 angstroms.

20. The method of claim 17 in which the metal oxide is selected from the group consisting of chromium oxide, titanium oxide, tantalum oxide, nickel oxide, and aluminum oxide.

21. The structure according to claim 1 in which the metal oxide is selected from the group of oxides consisting of oxides of metals of Groups III, IV, V, VI, or VIII of the Periodic Table.

22. The method according to claim 13 in which the metal oxide is selected from the group of oxides consisting of oxides of metals of Groups III, IV, V, VI, or VIII of the Periodic Table.

* * * * *